Feb. 2, 1960   J. S. FORRESTER ET AL   2,923,823
METHOD FOR DETERMINING THE PRESENCE OF ALDEHYDES IN MIXTURES
Filed March 17, 1959
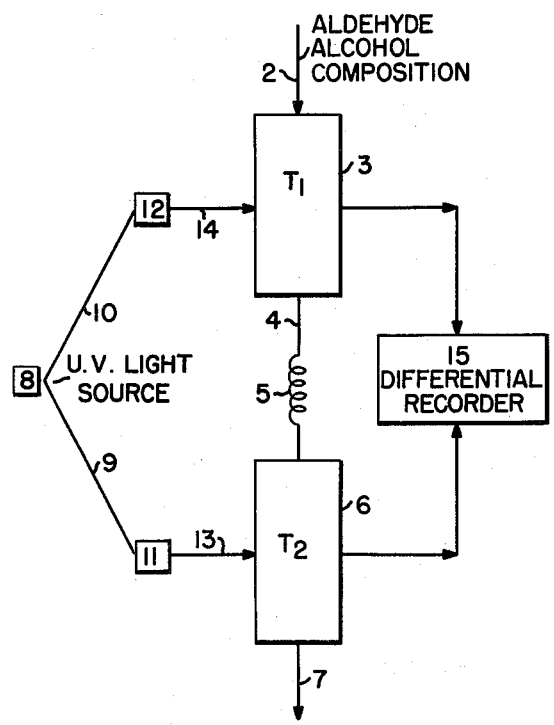
John S. Forrester
Elphege M. Charlet    Inventors
By R. D. Manahan    Attorney

# United States Patent Office 2,923,823
Patented Feb. 2, 1960

2,923,823

METHOD FOR DETERMINING THE PRESENCE OF ALDEHYDES IN MIXTURES

John Stanley Forrester and Elphege Maxime Charlet, Baton Rouge, La., assignors to Esso Research and Engineering Company, a corporation of Delaware Application March 17, 1959, Serial No. 799,941

11 Claims. (Cl. 250—43.5)

The present invention relates to a method for determining the presence of aldehydes in mixtures which contain aldehyde and alcohol. The mixtures are not limited to the aforementioned components but may include other substances, such as oxygenated compounds and/or aromatic hydrocarbon compounds. Specifically, the method involves determining the presence of aldehyde in an alcohol-containing mixture by the use of ultraviolet light.

In ultraviolet spectrophotometry, specifically double beam spectrophotometry, beams of light of a narrow wave length in the ultraviolet region of the spectrum are passed through a reference or control cell and a sample cell, and the amount of light absorbed by the sample cell less the amount of light absorbed by the reference cell is recorded. However, not all substances have sufficient ultraviolet absorption to permit them to be measured in this manner. While aldehydes exhibit this type of spectral activity, it has been noted that when they are admixed with an aliphatic alcohol, such as octyl alcohol and decyl alcohol, their activity is substantially reduced and it is difficult, if not impossible, to accurately measure their presence in the alcohol mixture, especially if interferences are present. While it is possible to determine the presence of impurities in an Oxo alcohol product stream by continuously measuring the ultraviolet light transmittance over a wide band, e.g. 220 to 350 m$\mu$ at 35 to 40° C., adjusting for any significant change in transmittance, this method does not indicate what impurity is in the stream. Since aldehydes have a deleterious effect on the color of the alcohol and its ester, it is important to know how much aldehyde is in the product.

It has now been discovered that aldehydes in alcohol-containing mixtures can readily be determined by means of an ultraviolet analytical process which involves the measurement of the amount of substantially monochromatic light absorbed by the acyclic iso-aldehyde or n-aldehyde in the mixture. This is achieved by passing two beams of substantially the same wave length through a reference cell and sample cell which are at different temperatures. It is essential that the two cells be at a different temperature because the measurement involves the reaction of the saturated or unsaturated $C_3$-$C_{20}$ aliphatic aldehyde with the aliphatic alcohol to form hemiacetal. Because the reaction between the alcohol and aldehyde is reversible and the direction of the reaction can be controlled by regulating the temperature of the reactants and the product, it is possible to measure the amount of aldehyde present in the composition by merely changing the temperature of one portion of the mixture and determining the ultraviolet light activity at the two temperatures. The use of a plurality of different temperatures permits the measurement of the difference in ultraviolet light absorbency at the temperatures employed.

In the preparation of alcohols by the Oxo process, aldehyde prepared by reacting olefin with hydrogen and carbon monoxide in the presence of a cobalt catalyst is subsequently hydrogenated to form an aliphatic alcohol which generally contains from 8–20 carbon atoms. The aldehydes which are not hydrogenated to the alcohols remain in the product and if present in an amount which is more than 0.025 wt. percent they produce an undesirable color when the acyclic alcohol is esterified. Because a substantial proportion of the esters are used as plasticizers for polymers which may be colorless, the presence of color greatly affects the salability of the ester for this purpose. It was found that the aldehyde impurities in the alcohol product readily formed a hemiacetal at room temperature or lower. This reaction may be reversed by increasing the temperature of the composition. The reaction is approximately 50% complete at 43° C. and essentially reversed to alcohol and aldehyde at about 90° C. To obtain a highly accurate measurement by this technique there should be a substantial temperature differential between the reference and sample cell. For example, if the reference cell is at room temperature the sample cell should be between 40 and 150° C. and preferably about 90 to 110° C. This latter temperature range is particularly applicable to Oxo alcohol products in which the alcohol and aldehyde have from 8 to 10 carbon atoms.

The accompanying drawing is a diagrammatic sketch of one embodiment of the process. The aldehyde-alcohol composition, e.g. $C_8$ to $C_{12}$ alcohol, flows through line 2 to cell 3 which is at a temperature $T_1$ e.g. 25° C., and leaves cell 3 via line 4 and the temperature of the aldehyde-alcohol composition is changed by means of a temperature regulator 5 which may be a cooling or heating coil, e.g. electrical or stream heated, and thereafter leaves line 4 and flows into cell 6 which is at $T_2$, e.g. 90° C. If the aldehyde-alcohol composition is part of a product stream, the composition which leaves cell 6 via line 7 may be added to the product stream from which it was taken. Two beams of light 9 and 10 emitted from an ultraviolet light source which produces wave lengths between about 270 and 290 m$\mu$ pass through monochromators 11 and 12 which may be either prisms or filters and the monochromatic light beams 13 and 14 pass through cells 6 and 3, respectively, and the intensity of the light transmitted through each cell is measured and the difference in intensity between the monochromatic light beams 13 and 14 is recorded by means of a differential recorder 15. The intensity measuring means in the differential recorder may employ an optical balance system in combination with a bridge-type photoelectric detector system to determine the absorbency in the sample cell (the cell in which the temperature is higher). The concentration measurement of the analyzer is transmitted, usually electrically to the recording means in the differential recorder 15.

The various sources of ultraviolet light radiation that may be used must be capable of providing radiation which is substantially monochromatic in order that the concentration readings can be predicted on the basis of the Lambert-Beer law. It should have its emission line spaced widely enough to permit the filters or prisms to transmit one wave length while screening out adjacent wave lengths. Because the process involves short wave lengths, a quartz mercury arc or hydrogen arc lamp should be employed. However, any light source which emits wave lengths of 260 to 300 m$\mu$ may be used. Continuous light sources such as hydrogen arcs and tungsten lamps generally require the use of prisms to produce a single wave length because the band which they transmit is quite wide. Optical light gates may be employed where necessary to maintain equality of intensity in the two beams in order to afford a high degree of stability over a long period of time.

The sample and reference cells may be composed of any transparent material which does not appreciably affect the transmittance of ultraviolet light. One type of cell which has been found suitable for the purposes of the present invention is that made with quartz.

Since the temperature in the cell affects the reaction equilibrium, it is important to maintain a substantially constant temperature in each cell in order to obtain reproducible results. Where the temperature difference between the cells is small, the temperatures of the cell should be kept as constant as possible. It may be necessary in some instances to employ cells which have a cooling or heating jacket which will permit careful adjustment and maintenance of temperature of the composition within the cell. Where the temperature difference between the cells is large, that is to say about 60° C. or more, the temperatures of the cells are less critical, e.g. they may vary ±1° C. without significantly affecting the accuracy of the determinations. Of course, where less accurate meaurements are required, the temperature may be permitted to fluctuate as much as ±5° C. where the temperature difference is substantial. The width of the cells depends upon the concentration of aldehyde in the composition to be measured. Where the composition contains a substantial amount of aldehyde cells having widths of 0.1 to 1 centimeter may be employed. If the concentration of aldehyde in the composition is low it may be necessary to use cells having widths up to 10 centimeters.

The analyzer should be periodically standardized by techniques which are well known in the art. Among the recording instruments available to the analyst are those having means for automatically standardizing the instrument at predetermined periods. Sustained high accuracy may be achieved by employing an optical null-balance principle together with periodic, automatic standardization.

The present invention is not restricted to the analysis of aldehydes in alcohols but rather is directed to the discovery that alcohol, especially a primary alcohol, may be used to selectively determine the presence of aldehyde in admixture with other substances including those which normally interfere with the measurement of aldehydes at any specific wave length. For example, higher molecular weight aliphatic aldehydes, i.e. aldehydes containing about 6 to 20 carbon atoms absorb the largest amount of ultraviolet light at a wave length of about 280 m$\mu$. By employing the process described herein, it is possible to accurately determine the amount of aldehyde in a mixture containing substances, such as aromatic and phenolic compounds, which absorb a significant amount of ultraviolet light at the aforementioned wave length. By adding a sufficient amount of alcohol to the aldehyde mixture to convert it to a hemiacetal, the amount of aldehyde in the mixture can be easily determined by measuring the difference in light intensity transmitted through two cells at different temperatures according to the method already described. Of course, standard curves will have to be prepared in order to translate the differences recorded by the analyzer into weight percent aldehyde in the mixture—or calculate K in the following equation:

$$K = \frac{a}{bc}$$

where:
  $a$ is absorbence
  $c$ is concentration
  $b$ is cell length
  $K$ is adsorption coefficient The invention has special application as a monitor for the product stream of an Oxo alcohol process. This monitoring process is capable of detecting as little as 0.002 wt. percent aldehyde, e.g. $C_{10}$ aldehyde, in Oxo alcohol. The monitor can be connected with a responsive means which adjusts the Oxo process according to the amount of aldehyde in the product. For example, the hydrogenation step in the Oxo process has a significant effect on the amount of aldehyde in the product and this step in the process can be regulated by the monitor to either increase or decrease the amount of aldehyde in the product stream.

The following example serves to illustrate the practice of the invention.

*Example*

A standard curve was prepared for $C_{10}$ n-aliphatic aldehyde $[CH_3(CH_2)_8CHO]$, isolated from a $C_{10}$ Oxo alcohol, by measuring the absorption of the aldehyde in a Beckman DK–2 spectrophotometer. The light source was a hydrogen arc lamp and the prisms in the spectrophotometer were adjusted to screen out all the wave lengths in the light other than that at 280 m$\mu$. To samples of decyl alcohol were added varying amounts of the $C_{10}$ aldehyde and these samples were then analyzed in the aforementioned spectrophotometer in 1 centimeter quartz cells at both 25° C. and 100° C. The aldehyde was determined by the following equations:

$$K^{Alc.}_{25° C.} = \frac{A^{25° C.}_s}{c \cdot 1 \text{ cm.}} = \text{absorbency index for aldehyde in alcohol at 25° C.}$$

$$K^{Alc.}_{100° C.} = \frac{A^{100° C.}_s}{c \cdot 1 \text{ cm.}} = \text{absorbency index for aldehyde in alcohol at 100° C.}$$

$$\Delta K = K^{Alc.}_{100° C.} - K^{Alc.}_{25° C.}$$

$$A^{25° C.}_s = \text{absorbency of sample at 25° C.}$$

$$A^{100° C.}_s = \text{absorbency of sample at 100° C.}$$

$$\Delta A_s = A^{100° C.}_s - A^{25° C.}_s$$

$$c = \text{concentration in g./l.}$$

$$1 = \text{cell thickness, cm.}$$

$$\text{Aldehyde concentration in g./l.} = \frac{\Delta A_s}{\Delta K \cdot 1 \text{ cm.}}$$

The following table shows the relationship between the amount of aldehyde added and the amount found in the various samples.

| Sample No. | Aldehyde Added to Decyl Alcohol, grams/liter | Aldehyde Found, grams/liter |
| --- | --- | --- |
| 1 | 1.9 | 2.1 |
| 2 | 2.8 | 2.9 |
| 3 | 4.6 | 4.8 |
| 4 | 6.6 | 6.7 |
| 5 | 9.1 | 9.4 |
| 6 | 11.8 | 12.4 |
| 7 | 15.1 | 15.5 |

The above data show that the amount of aldehyde added to the alcohol can readily be determined by the present process.

Resort may be had to various modifications and variations of the invention without departing from the spirit of the discovery or the scope of the appended claims.

What is claimed is:

1. Method for determining the presence of aldehyde in an alcohol-containing composition which comprises measuring the intensity of ultraviolet light transmitted through said composition at different temperatures, said light having a wave length which is at least partially absorbed by said aldehyde.

2. Method for determining the presence of acyclic aldehyde in an aliphatic alcohol-containing composition which comprises measuring the difference in ultraviolet light transmitted through said composition at two different temperatures, said light being at a wave length of 260 to 300 m$\mu$.

3. Method for determining the presence of acyclic aldehyde in a $C_8$ to $C_{20}$ alcohol-containing composition which comprises measuring the intensity of 270 to 290 m$\mu$ ultraviolet light transmitted through said composition at two temperatures that are substantially different.

4. Method according to claim 3 in which the difference between the temperatures is at least 60° C.

5. Method according to claim 3 in which one temperature is about room temperature and the other temperature is about 40 to 150° C.

6. Method according to claim 3 in which the aldehyde contains 8 to 20 carbon atoms.

7. Method according to claim 3 in which there is at least 0.002 wt. percent aldehyde in the alcohol-containing composition.

8. A continuous method for determining the presence of aliphatic aldehyde in a $C_8$ to $C_{20}$ primary alcohol product stream which comprises continuously flowing at least a portion of said product stream through two transparent cells, maintaining the alcohol product in each said cell at a substantially constant but different temperature, continuously measuring the intensity of a 260 to 300 m$\mu$ light beam transmitted through each said cell and recording the difference in intensity between said transmitted beams of ultraviolet light.

9. Method for determining the presence of acyclic aldehyde in an aliphatic alcohol which comprises measuring the difference in intensity of substantially monochromatic ultraviolet light having a wave length of 260 to 300 m$\mu$ transmitted through said alcohol at two temperatures that are substantially different, said aldehyde being in the form of a hemiacetal at one of said temperatures.

10. Method according to claim 3 in which the alcohol is a $C_8$ to $C_{12}$ primary aliphatic alcohol.

11. Method according to claim 3 in which the alcohol is decyl alcohol.

No references cited.